United States Patent [19]

Greenspan et al.

[11] Patent Number: 5,347,459
[45] Date of Patent: Sep. 13, 1994

[54] REAL TIME COLLISION DETECTION

[75] Inventors: Michael A. Greenspan, Ottawa; Nestor Burtnyk, Kanata, both of Canada

[73] Assignee: National Research Council of Canada, Ottawa, Canada

[21] Appl. No.: 32,314

[22] Filed: Mar. 17, 1993

[51] Int. Cl.⁵ .................. B25J 9/00; G06F 15/72
[52] U.S. Cl. ..................... 364/461; 395/90; 395/124
[58] Field of Search .......... 364/460, 461, 474.02; 395/90, 88, 92, 99, 141, 120, 124

[56] References Cited

U.S. PATENT DOCUMENTS

| | | | |
|---|---|---|---|
| 4,578,757 | 3/1986 | Stark | 364/461 |
| 4,922,430 | 5/1990 | Wavish | 364/461 |
| 4,985,856 | 1/1991 | Kaufman et al. | 395/124 |
| 5,038,302 | 8/1991 | Kaufman et al. | 395/124 |
| 5,047,916 | 9/1991 | Kondo | 395/90 |
| 5,056,031 | 10/1991 | Nakano et al. | 364/461 |
| 5,086,495 | 2/1992 | Gray et al. | 395/120 |
| 5,150,026 | 9/1992 | Seraji et al. | 395/90 |
| 5,150,452 | 9/1992 | Pollack et al. | 395/90 |
| 5,255,354 | 10/1993 | Mahoney | 395/128 |

OTHER PUBLICATIONS

Lozano-Perez, "Spatial Planning: A Configuration Space Approach," IEEE Transactions on Computers, Feb. 1983, pp. 108–120.
Khatib, "Real-Time Obstacle Avoidance for Manipulators and Mobile Robots," The International Journal of Robotics Research, Spring 1986, pp. 90–98.
Dodds, "Robotic Collision Control", IEEE Colloquim on Controllers for Robotic Applications, 1989, pp. 21–24.
Duffy et al., "Real-Time Collision Avoidance System for Multiple Robots Operating in a Shared Workspace", IEEE Proceeding, Nov. 1989, pp. 478–484.
Shaffer et al., "A Real-Time Robot Arm Collision Avoidance System", IEEE Transactions on Robotics and Automation, Apr. 1992, pp. 149–160.
Jun et al., "A Probablistic Approach to Collision-Free Robot Path Planning", IEEE, 1988, pp. 220–225.
Tornero et al., "Spherical-Object Representation and Fast Distance Computation for Robotic Applications", IEEE 1991, pp. 1602–1608.
Sakata et al., "Collision Avoidance System Concept for Mobile Servicing System", IEEE 1991, pp. 1641–1646.
Adolphs et al., "A Method for Fast Computation of Collision-Free Robot Movements in Configuration-Space", IEEE 1990, pp. 5–12.
Pobil et al., "A New Representation for Collision Avoidance and Detection", IEEE 1992, pp. 246–251.

*Primary Examiner*—Thomas G. Black
*Assistant Examiner*—Tan Q. Nguyen

[57] ABSTRACT

A method is provided for detecting a collision between a robot and one or more obstacles before it occurs. The robot is modeled by spheres in a voxelized workspace. Each voxel within the workspace is assigned a value which corresponds to its distance from the closest obstacle. A collision is determined to be imminent if the voxel value at the center of a sphere is less than the radius of the sphere in voxels.

9 Claims, 7 Drawing Sheets

REAL TIME COLLISION DETECTION

FIELD OF THE INVENTION

The invention relates to collision avoidance and more particularly, relates to methods of detecting a collision between an object and a device having one or more moveable elements before the collision occurs.

BACKGROUND OF THE INVENTION

In the field of robotics, much interest has been generated over the years in methods of collision avoidance between a robot and obstacles in its environment. Methods of collision avoidance have at their core, a method of collision detection. In general, to prevent a collision, the intersection of a set of moveable elements with a set of obstacles must be determined before the collision actually occurs. After it has been determined that a collision state is imminent, action can be taken to redirect the robot to avoid the collision.

Two broad categories of collision detection methods are: those methods that encode the occupancy of obstacles in a spatial index, and those that do not. Methods relating to the latter category, while satisfactory for on-line path planning, tend to be too slow to be effective for real-time collision avoidance. Typically a collision is detected by analytically calculating the distance between a set of geometric primitives describing a moveable element, and a set of geometric primitives describing obstacles. Determination of the collision status of the moveable element therefore requires the intersection calculation to be performed a number of times, equal to the product of the number of geometric primitives describing the moveable element and the number of geometric primitives describing the obstacles.

Lozano-Perez in a paper entitled "Spatial Planning: A Configuration Space Approach," IEEE Transactions on Computers, vol. C-32, no. Feb. 2, 1983 teaches a method of the second category heretofore mentioned. Lozano-Perez models both the moveable elements and the obstacles as polyhedra, and analytically calculates the intersections of planes.

Khatib, O., in a paper entitled "Real-Time Obstacle Avoidance for Manipulators and Mobile Robots," published in The International Journal of Robotics Research, vol. 5 no. 1, Spring 1986, models moveable elements as a set of points and line segments and presents the analytical distance formulae for a number of geometric primitives, including a parallelepiped, a cylinder, and a cone. Dodds, G., in a paper entitled "Robotic Collision Control", IEEE Colloquium on controllers for Robotic Applications—Concepts and Implementations, Digest no. 127, 1989, pp. 2/1-2/4 models moveable elements as spheres, and the obstacles as polyhedra; it has been suggested by others to model the moveable elements and obstacles as polyhedra, cylinders or spheres.

One technique that improves the processing speed of collision detection is to encode the occupancy of the obstacles in a spatial index. An example of this is the use of voxels. Voxels are discrete volume elements in the form of cubes. In some known schemes, all the voxels that are occupied by an obstacle are assigned a predetermined value, for example zero, while all other voxels are given another value. To determine whether a certain point in space is occupied by an obstacle, it is sufficient to perform a simple table lookup, locating the corresponding voxel and checking its value.

Advantageously, this method obviates the need to perform an analytic calculation of the distance between the geometric primitives describing the moveable elements and the geometric primitives describing the obstacles. Rather, the geometric primitives describing the moveable elements need only be compared to the values of the voxels that are quick to identify.

Duffy et al. in a paper entitled "Real-Time Collision Avoidance System for Multiple Robots Operating in a Shared Workspace", IEEE Proceedings, Vol. 36, Pt. E, No. Nov. 6, 1989, pp. 478-484 describe a system wherein both the moveable element and the obstacles are represented as sets of voxels, and a specialized digital hardware system was constructed to determined the overlap of these sets as the element moves thorough space.

Although the prior art methods for collision avoidance and detection appear to perform their intended function, some of these methods are too slow for real-time applications.

Therefore, it is an object of the invention to provide a method for collision detection that can determine a collision state in a timely manner.

Furthermore, it is an object of the invention to provide a method of collision detection wherein the speed of detection is independent of the number of obstacles in the environment.

In accordance with an aspect of the invention, in a device having one or more moveable elements residing within a finite space, a method of detecting a collision state between an object within the finite space and a model of the one or more moveable elements, comprising the steps of: (a) determining relative strengths of a set of discrete points throughout the space, the relative strength of any point being a measure of the distance from that point to the object; (b) storing values representative of the relative strengths in a memory; (c) determining values of relative strengths of a set of reference points which approximate a volume occupied by the model of the one or more moveable elements, the relative strength of each point being a measure of the distance around that point that is occupied by the model of the one or more moveable elements; (e) storing values representive of the relative strengths of the set of reference points in a memory and identifying a corresponding discrete point for each reference point; and, (f) comparing the stored values representative of the relative strengths of the reference points with the stored values representative of the relative strengths of the corresponding discrete points in the space, a collision state being detected when the ratio of any of the compared values representative of the relative strengths of the reference points and the values representative of the relative strengths of the corresponding discrete points in the space is greater than 1.

In accordance with another aspect of the invention in a device having a plurality of relatively moveable elements, there is provided a method of detecting a collision state between an object and a model of one of the moveable elements before a collision occurs, comprising the steps of: determining the value of the strength of each of a plurality of voxels within a finite space, the strength of any voxel being an indicator of the distance from that voxel to the object; identifying the voxel address at the center of one or more spheres which approximates a volume occupied by the model of the moveable element; and, comparing the values of the strengths of the voxels at the centers of the one or more spheres with a number of adjacent voxels that correspond to the respective radii of the one or more spheres, a collision state being detected when a compared value of the strength of the voxel at the center of a sphere is less than the value of the radii of that sphere.

BRIEF DESCRIPTION OF THE DRAWINGS

Exemplary embodiments of the invention will be described in conjunction with the drawings, in which.

DETAILED DESCRIPTION

Figure 1:
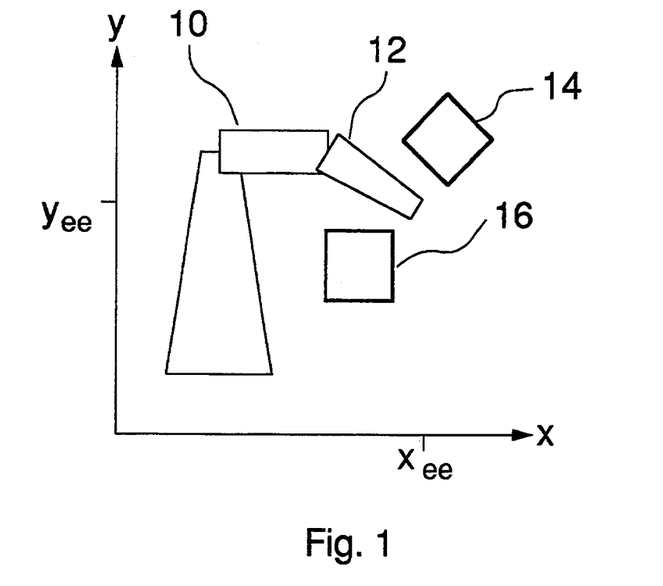
FIG. 1 is a two dimensional view of a 3 degree of freedom planar robot manipulator including obstacles in a workspace shown in a positive x-y quadrant of a Cartesian coordinate system.
Figure 2:
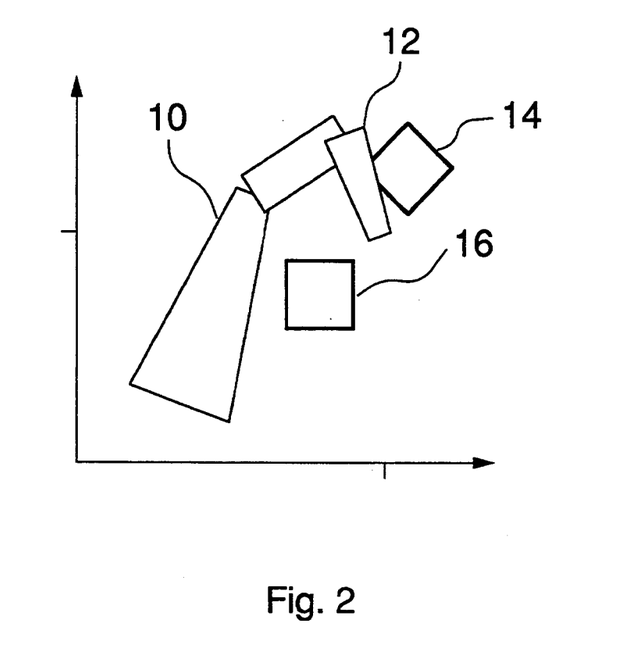
FIG. 2 is a two dimensional view of the manipulator of FIG. 1 shown in an different position.

The robot workspace is a finite space in which a robot may move. The workspace includes the robot and obstacles that are to be avoided by the robot. Referring to FIG. 1, a two dimensional (2-D) workspace is shown by way of example, and for the purposes of illustration. A three degree of freedom (d.o.f.) planar robotic manipulator 10 and end-effector 12 are positioned on an x-y plane representing the 2-D workspace. The end-effector 12 is shown at position ($x_{ee}, y_{ee}$) between obstacles 14 and 16. The method in accordance with the invention models the robotic manipulator and simulates and pre-calculates moves before the robotic manipulator 10 actually moves; calculations are performed to determine one or more collision-free locations the manipulator or the end-effector 12 may be moved to. In FIG. 2, another configuration of the manipulator 10 is shown, however, the end-effector 12 is also at position ($x_{ee}, y_{ee}$) between obstacles 14 and 16.

Figure 3:
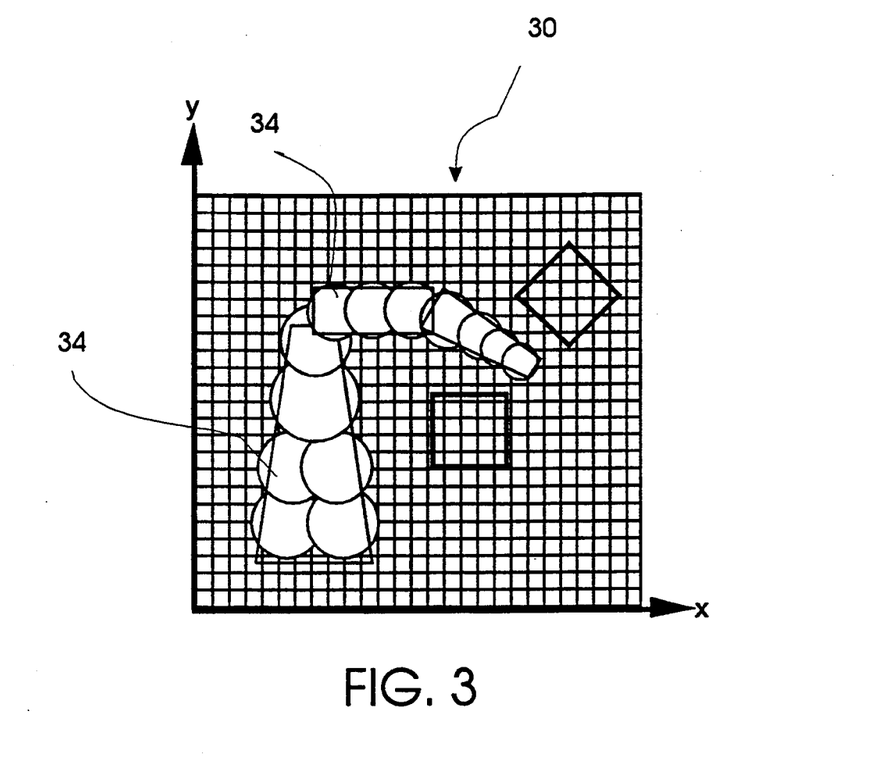
FIG. 3 is a two dimensional view of a spherical approximation of the manipulator of FIG. 1.
Figure 4:
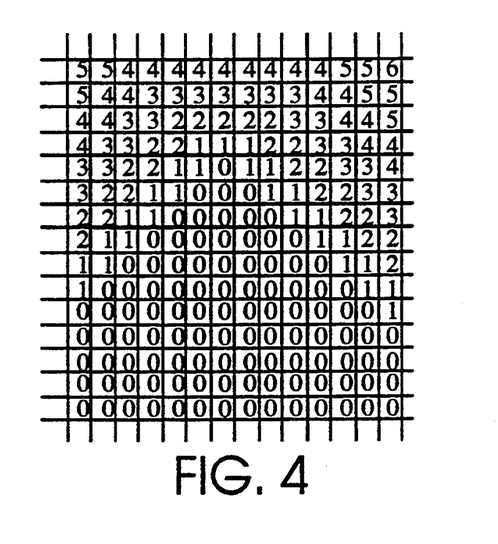
FIG. 4 is an grid of values which correspond to the distance of the manipulator from the top of the diamond shaped obstacle shown in FIG. 3.

The basic modeling structures used in the process of collision detection are illustrated in FIG. 3. The workspace 30 is mapped into a grid of elements and the manipulator 10 and end-effector 12 are modeled as a set of circles 34. The grid is mapped to an array of memory elements. Each grid element is assigned an integer value as shown in FIG. 4 stored in the memory array indicating its distance to an obstacle in grid units. The grid elements in FIG. 3 are of a coarser resolution than those in FIG. 4 that contain values representing the area around the top edge of the diamond shaped obstacle 14.

Grid elements with a value 0 represent space occupied by the obstacle, while elements with a value n, n = {1, 2, 3, ... }, are a distance of m grid elements away from the closest obstacle, where n ≦ m < n + 1. The value n may be thought of as a value representing a relative strength between elements. With the above described representations determining the collision status of a particular configuration of the manipulator 10 is performed in the following manner. The centers of the circles are calculated and the value of the grid element at each circle center is then compared to the radius of that circle (measured in units of grid elements). For each circle, if the circle radius is less than the grid element value at the center of the circle, then the configuration is free of collision. Otherwise, if any circle center in the configuration has a radius greater than the value at that circle's center, the manipulator is in collision with the closest obstacle.

Figure 5:
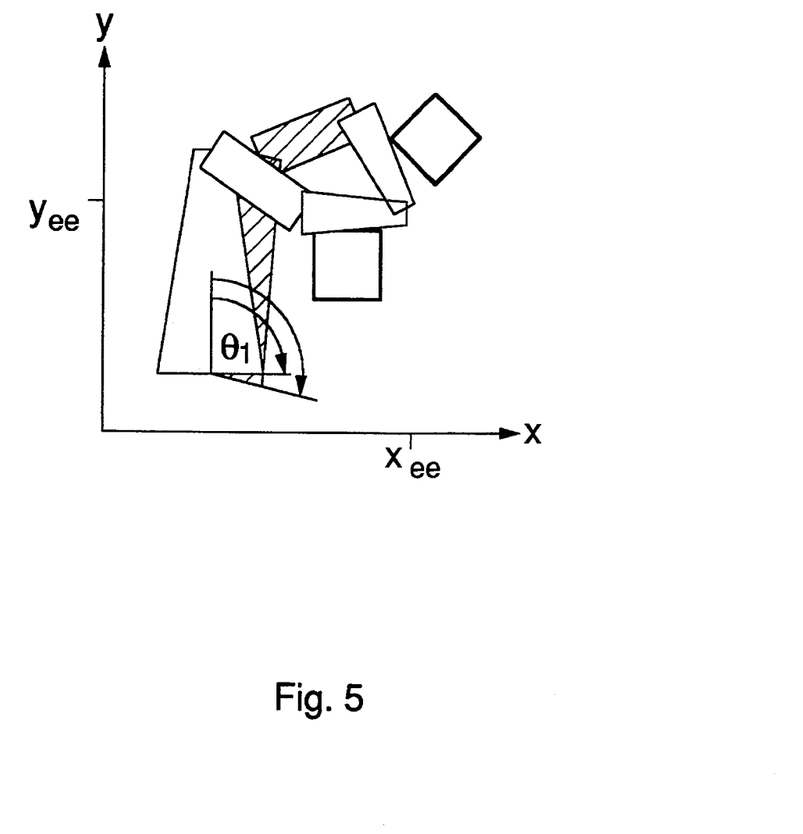
FIG. 5 is a two dimensional view showing the manipulator in two positions with reference to an angle $\theta_1$ representing an unconstrained range of movement.

To determine a collision-free state for a given end-effector coordinate, for example end-effector 12 in the figures shown, it is necessary to determine the unconstrained motion of the manipulator with respect to some variable. By way of example, one choice of variable is the range of movement of one of the manipulator 10 joints. There may exist other suitable parameters, depending on the kinematic linkage of the manipulator. For example, in FIG. 5 the end-effector coordinate is ($x_{ee}, y_{ee}$) and the parameter is $\theta_1$. The value of $\theta_1$ is incremented over its entire range, and the collision status is evaluated at each iteration. Once the range for collision-free movement is established, the midpoint of the collision-free range of $\theta_1$ is preferably chosen as the next value of the parameter.

Figure 6:
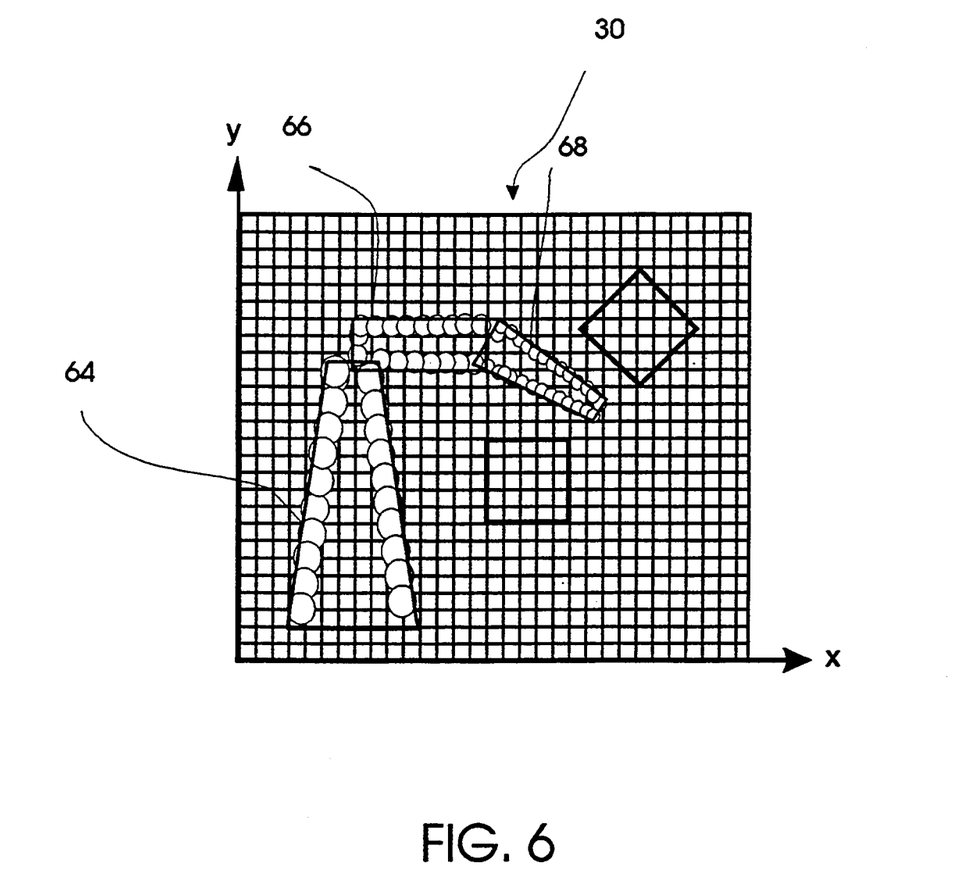
FIG. 6 is a two dimensional view of the manipulator of FIG. 3 with varying sized spheres shown as circles around the periphery of the manipulator.

In FIG. 6 different sized circles 63, 66, and 68 are used to approximate a volume of the manipulator close to its outer surface. As the circles become smaller and closely match the outer surface contour of the manipulator this volume approximation may be considered an approximation of the surface area of the manipulator. The volume approximated by the circles corresponds in location to a layer extending along the surface of the manipulator, the thickness of the layer being equal or less than the diameter of the one or more circles. Advantageously, the interior of the manipulator is left unfilled; computing circles for the interior space would not yield additional information about whether a path is collision free. Alternatively, the volume or surface area of the manipulator could be represented by a set of reference points instead of a set of circles. In that case the relative strength of each point would be a measure of the distance around that point occupied by the manipulator.

FIGS. 1 to 6 are by way of example illustrative of the basic data structures used in the process of collision detection. However, since robots move in a 3-D space, in the preferred embodiment of the invention, the workspace is represented by discrete 3 dimensional elements; the circles in the above examples are replaced by spheres; as well, the grid is in the form of a three dimensional grid known as a voxel map. The elements may be represented as discrete points or by various forms of polyhedra. In a preferred embodiment, the discrete elements are represented by cubes or voxels. Voxels are the 3-D analogy to pixels in a 2-D digital image. Each voxel occupies a discrete addressable location; each voxel has an associated memory location that can be assigned an attribute represented by an integer value. Each voxel is initialized to a predetermined value representing an empty unit of space. To avoid uncertainty, the initialization value is different from those values used as a distance measurement from an object and different from the value representing an occupied unit of space. Each obstacle is discretized and the associated voxels are assigned a zero value, representing an occupied unit of space. After all obstacles have been voxelized, each non-obstacle voxel is assigned a value that represents the distance from that voxel to the closest obstacle. The assigned value of any voxel is a measure of its distance to the surface of the nearest obstacle. For example, a voxel adjacent to an obstacle voxel, is assigned a value of 1; voxels 2 voxels away from an obstacle voxel, are assigned a value 2, and so on.

Figure 7:
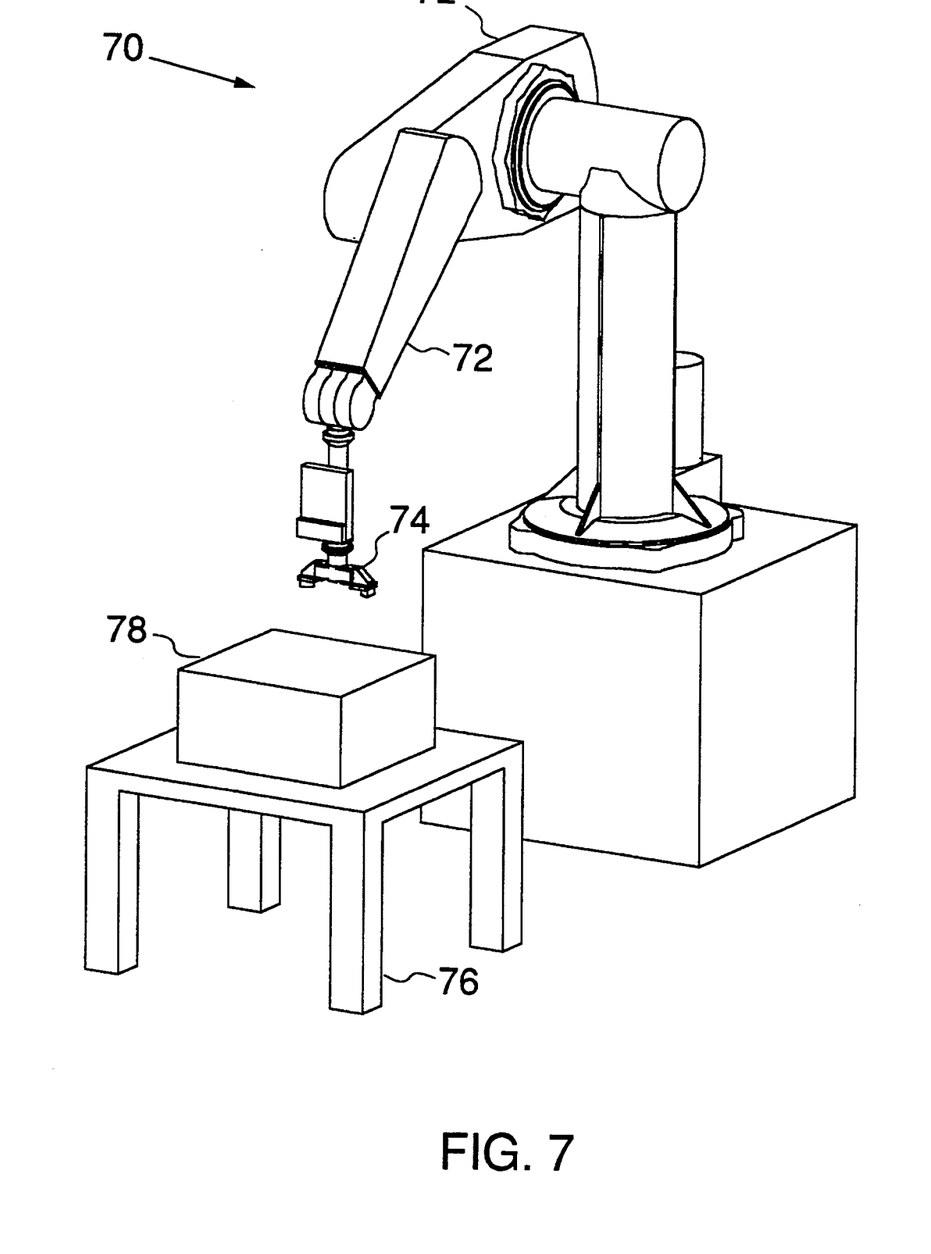
FIG. 7 is an isometric view of a robot manipulator positioned above a table supporting a workpiece.
Figure 8:
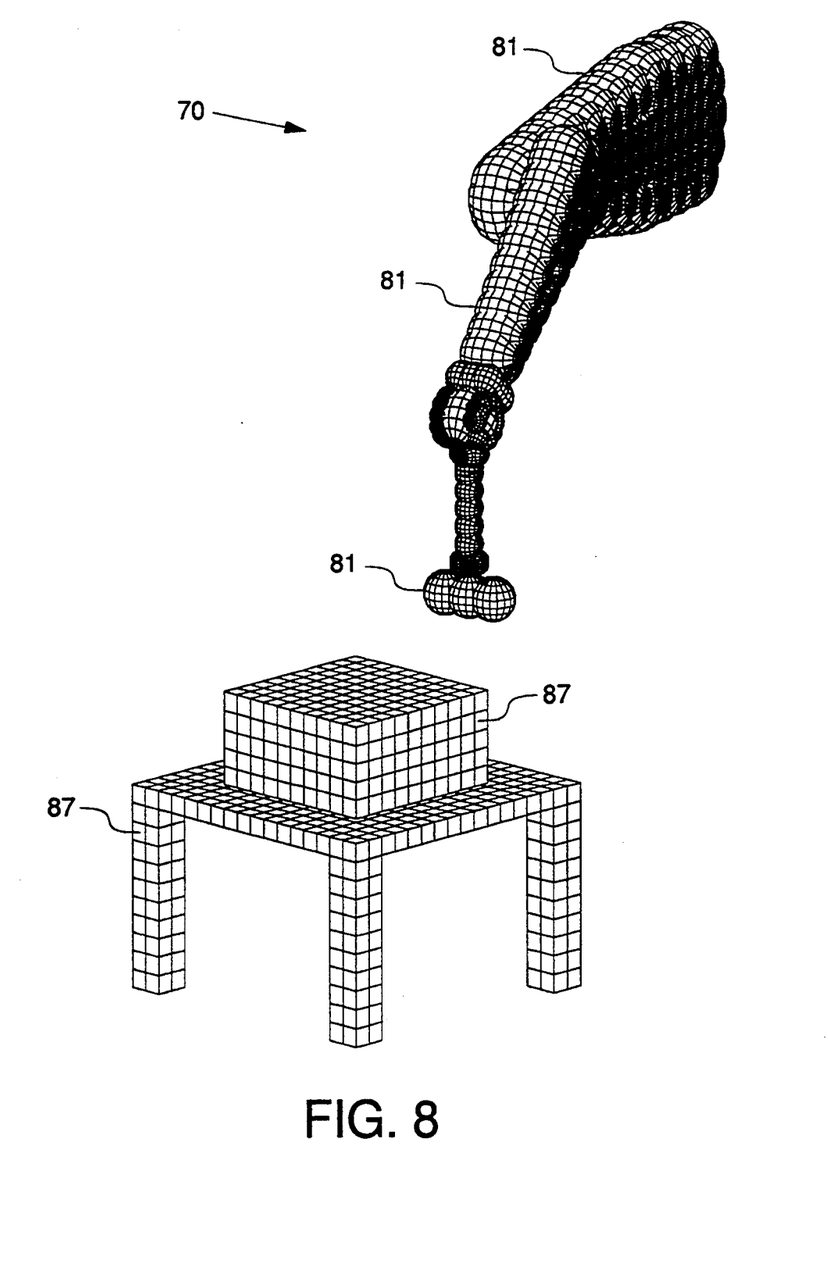
FIG. 8 is an isometric view of the manipulator of FIG. 7 modeled by spheres having an end-effector positioned above the table modeled by voxels supporting a workpiece; and, FIG. 9 is a side view outline of the manipulator, supporting table, and workpiece shown in FIG. 8 in a voxelized workspace.
Figure 9:
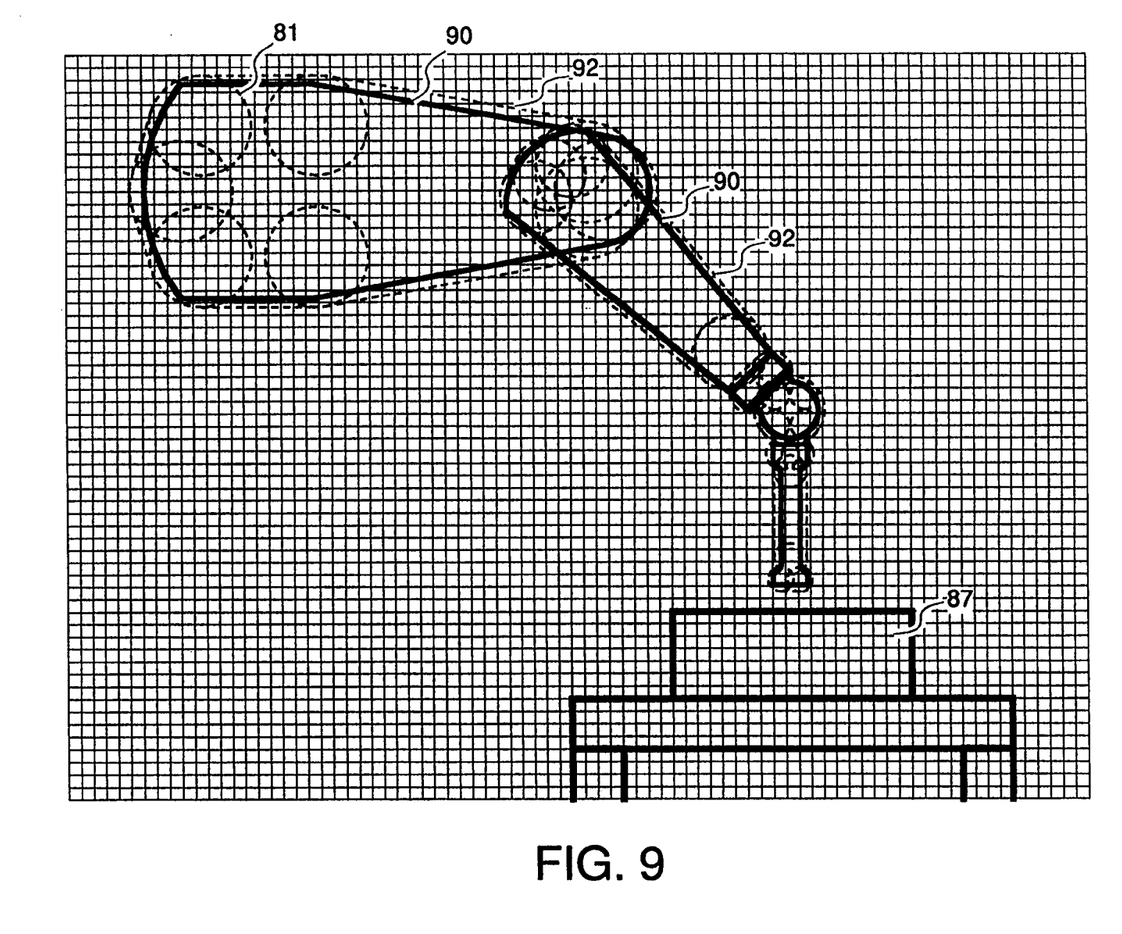

Referring to FIG. 7 a teleoperated robot 70 is shown having a manipulator 72 and an end-effector 74 positioned above a table 76 and workpiece 78. In FIG. 8 the table 76 and workpiece 78 are represented as voxels 87. For the sake of clarity, only a portion of the workspace is shown in the form of voxels in FIG. 8. The robot 70 is modeled by spheres 81 which overlap one another to ensure that the region near the outer layer of the manipulator is completely modeled by the spheres. In FIG. 9, the workspace is shown represented by voxels 87. A solid outline 90 of the teleoperated robot is shown inside a dashed outline 92. The dashed outline 92 is delineated to show the area contained by the spheres 81; only some of the spheres used to model the manipulator are shown in FIG. 9. Ideally, in order to accurately determine within a small range if a collision will occur for a particular modeled position of the manipulator, it is preferable to have the dashed outline 92 be as close as possible but not inside the solid outline 90. Of course there are trade-offs in accomplishing this. For example, the size and density of the spheres may be varied. If the spheres are made smaller and are tightly packed with some overlapping, the spheres can closely approximate the solid outline 90. However, as the number of spheres increase, the time it takes to determine a collision state will also increase. When larger loosely packed spheres are used to approximate the manipulator, the dashed outline is further apart from the solid outline; the result of whether a collision is imminent is calculated more quickly, however the result is more crude; the manipulator is not able to move as close to an object as when the dashed outline closely mirrors or is just outside the solid outline.

In one embodiment of the invention, each voxel is a cube with 2 cm. width. This allows an 8 cubic meter reachable space of a robot's manipulator to be encoded in a voxel map containing $10^6$ voxels. When obstacles are added to the environment, they are coded into the voxel map by a process known as voxelization. The voxel map is then expanded to encode the distances of each voxel to the nearest obstacle. The process of voxelization is defined below in pseudo code.

The robot's manipulator is represented by a spherical model. Various sized spheres are positioned throughout the volume of each moveable element or link to approximate the surface of the manipulator. It is preferable for the model to completely enclose the manipulator and not to extend more than $\frac{1}{2}$ of the voxel resolution (i.e., 1 cm) past the surface. The model should use the least number of spheres that can satisfy these constraints. In the current implementation, approximately 300 spheres are used to model the manipulator within the 1 cm. resolution.

VOXELIZATION METHOD

The following voxelization method identifies voxels addresses that are contained within an object in the workspace.

For a polygon P located and oriented at some position and orientation in a 3-D space, the voxels occupied by P within the space can be determined as follows:

1. Map the polygon P to a 2-D reference plane.
2. Rotate the polygon by $\theta_x$ around the x-axis and by $\theta_z$ around the z-axis so that it is parallel to the x-z plane. Let the rotated polygon be P'.
3. Translate the rotated polygon P' by $\Delta x$ along the x-axis and $\Delta z$ along the z-axis so that every vertex of the translated P' has a positive x and z component that is greater than zero. Let the translated polygon P' be P''.
4. Flood fill a discrete grid in the positive x-z quadrant. Starting with the grid element at coordinate (0,0) as a seed, apply a flood fill colouring algorithm to distinguish between the inside and outside of P''. Note that from step 2 it is known that P'' does not reside in the seed element, so the grid elements exterior to the polygon will be coloured.
5. For every non-coloured gird element, translate and then rotate the coordinate of the elements by $(-\Delta x, -\Delta z)$ and $(-\theta_z, -\theta_x)$. The voxels at these new coordinates are the voxels occupied by P within the 3-D space.

This method is used to voxelize the surface of a polyhedra by successively voxelizing the constituent polygon of the polyhedra. Note that in step 1., the rotations can occur around any 2 orthogonal axes, mapping the polygon P to an arbitrary 2-D plane.

Although voxels are the preferred representation of discrete points or volumes in space, other representations of discrete points may be envisaged.

VOXEL EXPANSION METHOD

The voxel expansion method assigns relative strengths to voxels in the form of integer values so that the value of any voxel is a measure of its distance to the nearest obstacle. This expansion process is generally performed after the workspace has been voxelized. The method increments through the voxel map six times in six separate directions: $\pm x$, $\pm y$, $\pm z$. When an obstacle voxel is encountered, a counter is reset to the value zero. At each subsequent voxel, the counter is incremented, and the current voxel value is compared to the counter value. If the counter value is less than the current voxel value, the voxel value is set to the counter value. After 6 passes through the voxel map, the value of each voxel will be a predetermined integer value representing an obstacle voxel, or an integer indicating the distance to an obstacle voxel.

COLLISION DETECTION METHOD

Let O be a set of obstacles within a 3-D space. Let D be a spherical approximation of a device within the some 3-D space such that $D = \{(C_i, R_i), i=1,n\}$, where $(C_i, R_i)$ are the respective centers and radii of the n spheres comprising the approximation, and the device is completely contained within D.

The collision between O and D can be detected by the following steps:

1. Voxelize the obstacles in O.
2. Expand the voxel space so that the value of a voxel is the integral value of the distance of that voxel from the closest obstacle voxel.

3. For i=1 to n, compare the value $V_i$ of the voxel at the sphere center $C_i$ with $R_i$. If some $V_i < R_i$, then D is in collision with some obstacle in O. Otherwise, D is not in collision with any obstacles in O.

COLLISION AVOIDANCE METHOD A

Let D be a spherical approximation of a servo-controlled device, which can be positioned within a space shared by a set of obstacles O. Let P be the next position of the device D. A method which will ensure the collision free motion of D within the space is:

1. Voxelize the obstacles in O.
2. Read next position P from the servo-controller. Detect the collision status of D with O if in position P.
3. If D is collision-free from O when in position P, then move D to P. Otherwise, do not move D to P. Repeat steps 2 and 3.

Note that the next desired position of the device D must be close enough to the current position of the device D so that the change in voxel occupancy of any sphere in D does not exceed one voxel.

COLLISION AVOIDANCE METHOD B

Let D be a spherical approximation of a servo-controlled device, which can be positioned within a space shared by a set of obstacles O. Let P be the next position of the device D as input from the servo-controller. If the configuration of D is under constrained by the position P, then there will exist a range of configurations of D which will satisfy P. A method which will ensure the collision free motion of D within the space is:

1. Voxelize the obstacles in O.
2. Read next position P from the servo-controller. For a set of configurations of D which position the device at P, detect the collision status of D with O. Order the configurations within the set by the closeness of collision with O.
3. If the configuration of D which is furthest from collision is collision-free, then move D to P in this configuration. Otherwise, do not move D to P. Repeat steps 2 and 3.

Note that the next desired position of the device D must be close enough to the current position of the device D so that the change in voxel occupancy of any sphere in D does not exceed one voxel.

The above representations provide the framework for a straightforward collision detection method. The forward kinematic solution is applied to each link of the spherical manipulator model, and the center of each sphere is compared to the voxel corresponding to its location. If the value of the voxel is not greater than the radius of the sphere, then the manipulator in its modeled position is deemed to be in collision with some obstacle.

Results show that single collision test of the entire manipulator takes 4 msec on SGI 4D35 Iris workstation, and 15 msec on a 50 MHz PC 486. Advantageously, this time performance is independent of the number of obstacles in environment. A tradeoff which has been made to achieve this high performance is resolution. The resulting path can be planned only within a certain clearance of the obstacles in the environment, equal to the voxel size (i.e. 2 cm). However, this restriction is reasonable for gross motion planning.

What we claim is:

1. In a device having one or more moveable elements residing within a finite space, a method of detecting a collision state between an object within the finite space and a model of the one or more moveable elements, comprising the steps of:
   (a) determining relative strengths of a set of discrete points throughout the space, the relative strength of any point being a measure of the distance from that point to the object;
   (b) storing values representative of the relative strengths in a memory;
   (c) determining a set of values of relative strengths of a set of reference points by approximating a volume occupied by the model of the one or more moveable elements by a set of spheres, each sphere being centered at one of the reference points, the relative strength value of each reference point, corresponding to a radius of a sphere centered at that point;
   (d) storing the set of values in a memory;
   (e) identifying the discrete points that correspond in location to each of the reference points; and,
   (f) comparing the stored values representative of the relative strengths of the reference points with the stored values representative of the relative strengths of the corresponding discrete points in the space, a collision state being detected when the ratio of any of the compared values representative of the relative strengths of the reference points and the values representative of the relative strengths of the corresponding discrete points in the space is greater than or equal to 1.

2. The method defined in claim 1 further comprising the step of redirecting the moveable element if a collision state is detected.

3. The method as defined in claim 1 further comprising the step of:
   (g) repeating steps (e) to (f) for incrementally different positions of the model of the one or more moveable elements positioned at different locations within the finite space to determine a plurality of collision free states until a collision state is detected.

4. The method defined in claim 1 wherein each discrete point comprises a voxel.

5. In a device having at least one relatively moveable element, a method of detecting a collision state between an object and a model of the device comprising the steps of:
   a) determining the value of the strength of each of a plurality of voxels within a finite space, the strength of any voxel being an indicator of the distance from that voxel to the object;
   b) identifying the voxel strength at the center of one or more spheres which approximate a volume occupied by the model of the one or more moveable elements; and,
   c) comparing the values of the strengths of the voxels at the centers of the one or more spheres respectively with radii of the one or more spheres, a collision state being detected when a compared value of the strength of the voxel at the center of a sphere is less than or equal to the value of the radius of that sphere.

6. The method according to claim 5 further comprising the step of preventing the at least one moveable element from moving closer to the object when the ratio of the value of the strength of the voxel at the center of the sphere divided by the number of adjacent voxels that correspond to the radius of the sphere is less than one.

7. The method as defined in claim 5 further comprising the step of: (d) repeating steps (b) and (c) for incrementally different positions of the model of the one or more moveable elements to determine a plurality of collision free states, until a collision state is detected.

8. The method according to claim 5 wherein the step of determining the value of the strength of each of a plurality of voxels within the finite space comprises the steps of:

assigning all voxels located a distance from the object a value which corresponds to the distance in units of voxels from the object, wherein a first set of voxels occupying a space next to the object are assigned a value of one, and a second set of voxels occupying a space adjacent the first set of voxels and being a distance one voxel away from the object are assigned a value of two, and so on, such that a set of voxels that are located a distance less than the width of n voxels and greater than or equal to the width of $n-1$ voxels from the object are assigned a value of n.

9. The method according to claim 5 wherein the volume approximated by the one or more spheres corresponds in location to a layer extending along the surface of the moveable element, the thickness of the layer being equal or less than the diameter of the one or more spheres.

* * * * *